Aug. 24, 1965
L. J. ARP ETAL
3,202,893
VARIABLE DIFFERENTIAL GEAR DRIVE AUTOMATIC
CONTROL APPARATUS FOR MACHINES
Filed April 9, 1962
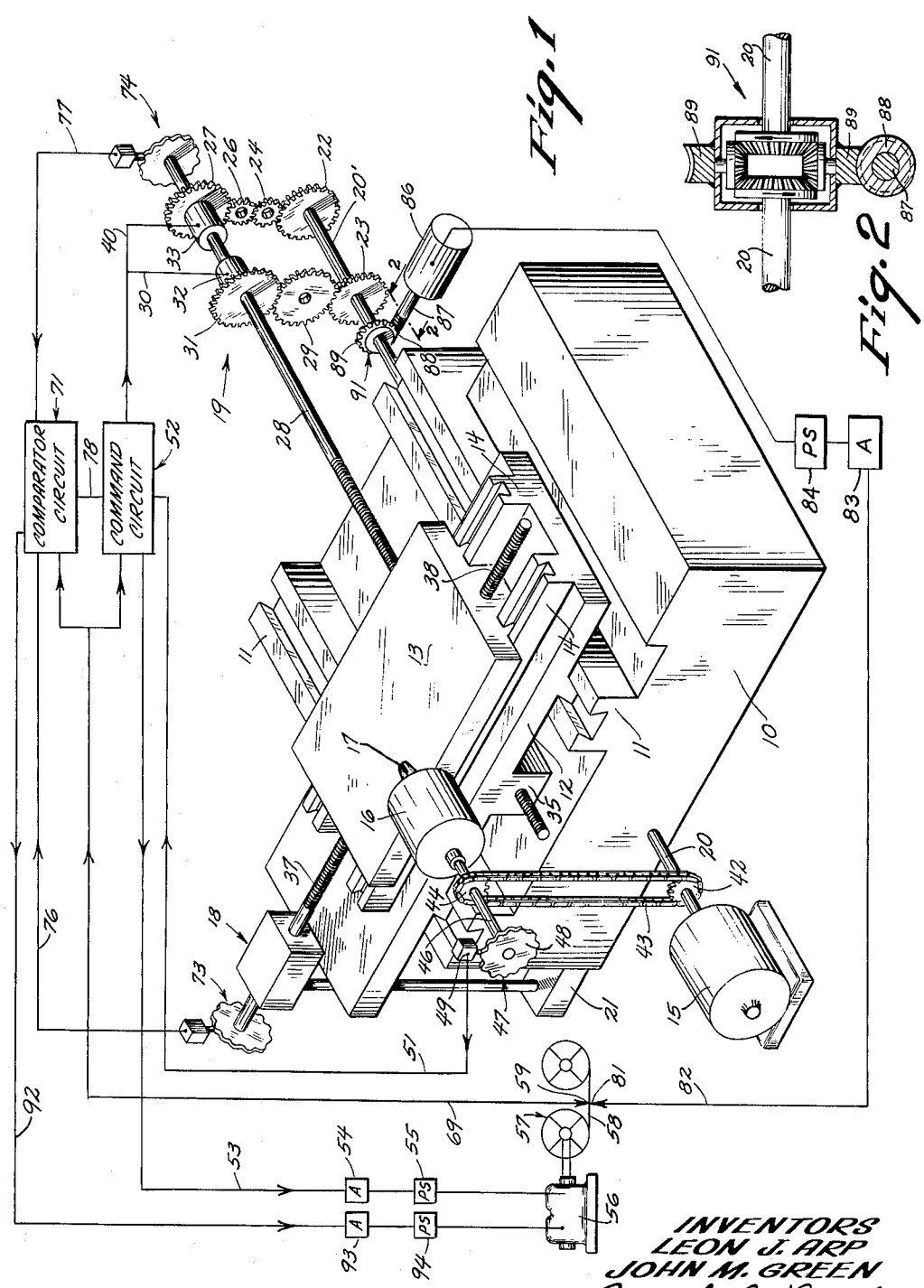
INVENTORS
LEON J. ARP
JOHN M. GREEN
BY Rudolph L. Lowell
ATTORNEY
WITNESS
NORMAN G. TRAVISS

United States Patent Office 3,202,893
Patented Aug. 24, 1965

3,202,893
VARIABLE DIFFERENTIAL GEAR DRIVE AUTOMATIC CONTROL APPARATUS FOR MACHINES
Leon J. Arp and John M. Green, Ames, Iowa, assignors to Iowa State University Research Foundation, Inc., Ames, Iowa, an association of Iowa
Filed Apr. 9, 1962, Ser. No. 186,179
4 Claims. (Cl. 318—13)

This invention relates generally to apparatus for the control of movable elements of any type, and more particularly to apparatus for effecting the automatic positioning of a movable element of a machine tool at a selectable variable rate proportional to the continually varying rate of the driving mechanism for the machine tool.

It is an object of this invention to provide a new and novel automatic control apparatus for the positioning of a movable element.

It is another object of this invention to provide a new and novel automatic control apparatus including a variable ratio drive system which maintains a selectable variable ratio between the input drive to a machine tool and the output drive to a driven, movable element of the machine tool.

A further object of this invention is to provide an automatic control apparatus for a machine tool or the like including a programmed tape the rate of movement of which is maintainable at a selected ratio to the input drive of the machine tool.

Yet another object of this invention is to provide an automatic apparatus for controlling the rate of movement of an element, wherein a variable ratio drive system for the element is controlled by a program control system operated by synchronous means operably connected to the input drive mechanism, whereby the program control system is operated at a rate proportional to the rate of the input drive mechanism.

Another object of this invention is to provide an automatic control apparatus capable of maintaining a rate of movement of a driven element in a predetermined proportion to the rate of movement of a drive element, and additionally capable of selectively varying the said proportion.

A further object of this invention is to provide an automatic control apparatus capable of accomplishing the objectives mentioned hereinbefore which is economical of construction, effective in operation, and which can be easily serviced by technician-type personnel.

These objects, and other features and advantages of this invention will become readily apparent by reference to the following description and the accompanying drawing wherein FIG. 1 is a diagrammatic perspective view of the machine tool and the automatic control apparatus therefor of this invention, and FIGURE 2 is a detail in section taken along the line 2—2 of FIGURE 1 illustrating the differential.

Referring to the drawing, the automatic control apparatus is illustrated in conjunction with a machine tool of a lathe type wherein the apparatus is utilized to move a cutting tool element longitudinally and/or laterally with respect to a stationary but otherwise rotating work piece in such manner that the work piece will be cut to a desired shape. It may readily be appreciated that the apparatus can also be utilized to move the work piece relative to the cutting tool to accomplish the same result.

In FIG. 1, a base 10 is provided for supporting a pair of dovetail members 11 affixed to the base 10 and which in turn support a table 12 for movement longitudinally of the base 10. A carriage 13 is movably mounted on another pair of dovetail members 14 affixed to the table 12 for movement transversely of the base 10. A rotary spindle 16 provided with a work piece holding chuck 17 is arranged through suitable drive means to drive the chuck 17 at a selected speed.

The carriage 13 is adapted to support one or more cutting tools (not shown). Thus, by varying the longitudinal and lateral movement of the tool-holding carriage 13, the work piece can be cut to any desired shape.

To provide power for operating a pair of drive mechanisms, indicated generally at 18 and 19 in FIG. 1, a motor 15 is provided, and which rotates a drive shaft 20 journaled in the base 10. Since each drive mechanism 18 and 19 is identical, except for the mechanism 18 being driven through a shaft and gear train 21 from the drive shaft 20 in the manner of lathe gearing, only the drive mechanism 19 is illustrated in detail and will be described hereinafter. It is to be remembered therefore, that everything described as to drive mechanism 19 pertains also to drive mechanism 18. The driving connection between the shaft 20 and the gear train 21 is such that the latter moves longitudinally of the shaft 20 in accord with and upon movement of the table 12 relative to the base 10.

A pair of drive gears 22 and 23 are mounted on the end of the drive shaft 20 opposite the motor 15. Gear 24 is in constant mesh with drive gear 22, and with gear 26, which is in driving engagement with a gear 27 rotatably mounted on a lead screw 28. The other drive gear 23 is in constant mesh with gear 29 which in turn drives a gear 31 rotatably mounted on the lead screw. As a result on unidirectional rotation of the drive shaft 20, the lead screw gears 27 and 31 are rotated in relatively opposite directions.

A pair of magnetically actuated clutch devices 32 and 33 are mounted in spaced relation on the lead screw 28. Each device 32 and 33 is operable to lock a respective lead screw gear 27 and 31 to the lead screw 28. Thus, for example, should clutch device 32 be actuated, the rotational drive of gear 31 would be transmitted to the lead screw 28.

As the longitudinal lead screw 28 acts with a threaded member 35 affixed to the underside of the carriage 13 to move the carriage toward or away from the spindle chuck 17, actuation of the clutch devices 32 and 33 determines the direction of movement of the carriage 13 toward or away from the work piece. Similarly with the transverse lead screw 37, which acts with threaded member 38 to provide for movement of the table 13 transversely of the spindle chuck 17, actuation of either of a pair of clutch devices (not shown) in the gear mechanism 18 determines the direction of movement of the table 12.

In this arrangement of longitudinal and transverse lead screws for moving a cutting tool and a work piece relative to each other, it is desirable under certain circumstances to obtain as complete an automatic control of the machining operation as possible. Such is achieved by the following apparatus.

Attached to the drive shaft 20 for rotation therewith is a sprocket gear 42 which rotates via a chain 43 a sprocket 44 mounted on a spindle shaft 46 which also carries the chuck 17. Also mounted on the spindle shaft 46 is a rotary switch 47 comprising a cam wheel 48 having a plurality of notches about its periphery. An on-off switch 49 is engageable with the notched periphery for making and breaking the circuit in response to rotation of the cam wheel 48.

A lead 51 connects the rotary switch 47 to a command circuit, indicated generally at 52 in block form. The rotary switch 47 is used as a pulse generator in that upon rotation of the cam wheel 48, the action of the switch 49 produces a number of pulses proportional to the rate and degree of rotation of the spindle shaft 46. The pulses from the command circuit 52 are conducted through lead 53 for amplification at 54, for shaping at 55, and then used to energize a synchronous motor 56.

The motor 56 is attached to one of the spools of a tape device 57, either directly as illustrated or through gearing, drive pulley, or other known means, so as to rotate the tape device 57. Thus, by loading the tape device 57 with a record or programmed tape 58, operation of the motor 56 results in the tape 58 being moved across a pickup or scanning means 59 at a known rate of speed which is proportional to the rotational rate or speed of the input drive shaft 20. In the particular embodiment employed here, the tape 58 is of a conventional magnetic type having a minimum of eight columns, each of which contains one or more recorded pulses of predetermined relative location.

From the scanning means 59, which comprises an eight channel magnetic play back head, the coded program data is converted into usable electric pulses. Certain of these pulses are transmitted through lead 69 to the command circuit 52, and certain others to a comparator circuit indicated generally at 71 in FIG. 1. Within the command circuit 52, as detailed in co-pending application filed January 31, 1962, Serial No. 170,197, the pulses are utilized as signals to control the actuation and de-actuation of the clutch devices 32 and 33 (FIG. 1) of the gear mechanism 19, connected by leads 30 and 40, respectively, to the command circuit 52, to control the direction of rotation of the lead screw 28. Certain other of the pulses can be utilized as signals to start and stop operation of the motor 56 as deemed necessary.

The arrangement in co-pending application Serial No. 170,197 is such that when a cut is started, initiated by the actuation of one of the clutch devices 32 and 33, the circuit to the motor 56 is opened and the travel of the tape 58 is stopped. Subsequently, when the cut is stopped, by de-actuation of the actuated clutch device, the circuit to the motor 56 is closed and the tape 58 is moved so that the scanning means 59 again feeds further pulses to the command and comparator circuits 52 and 71.

Within the comparator circuit 71, certain of the pulses pre-set a conventional electric counter as to the number of revolutions of the lead screw 28 necessary to make a particular cut. It will be understood that the initial relationship between the carriage 13 and the table 12 with the work piece will have been included in the programmer's calculations. This number provides a reference number as to the desired longitudinal movement of the table 12, either toward or away from the work piece chuck 17. To provide an accurate determination of the number of revolutions of the lead screw 28, and further which number is independent of absolute time as compared to machine time, each lead screw 28 and 37 is provided with a rotary switch 73 and 74 similar in structure and function to rotary switch 47.

Each lead screw rotary switch 73 and 74 counts the number of revolutions of its respective lead screw by virtue of its on-off action upon rotation of the lead screw, and thereby acts as a pulse generator. The electric pulses are transmitted through leads 76 and 77, respectively, for the rotary switches 73 and 74 to the comparator circuit 71. There, the pulses from either pulse generator are totalized to produce an electrical effect or number indicative of the position of the respective carriage 13 or table 12, and the number is compared to the reference number in the preset counter in the comparator circuit 71. When a coincidence subsequently occurs between the reference number and the lead screw number, a command signal results which is transmitted through lead 78 into the command circuit 52 for modifying the operating signals, for example, for the clutch devices 32 and 33 and for the motor 56.

Thus, in brief, the operation of the control apparatus is as follows relative to the carriage 13. Rotation of the drive motor 15 results in the drive shaft 20 rotating the gears 27 and 31 in relatively opposite directions on the lead screw 28. Rotation is also imparted to the spindle shaft 46 for rotating the work piece holding chuck 17 and for operating the pulse generator 47.

The pulses from the pulse generator 47 are sent to the command circuit 52, amplified, and by virtue of the setting of the command circuit 52, utilized to drive the motor 56 which in turn operates the tape device 57 to move the programmed tape 58 across the scanner 59. The scanner converts the tape information into usable electric signals which are fed into the command circuit 52 and the comparator circuit 71. Within these circuits the signals perform three main operating functions. First, they set certain switches to produce an electrical effect by presetting a counter (not shown) with a reference number indicative of the desired amount of travel of the carriage 13 as moved by rotation of the lead screw 28. Second, they actuate equipment to control the operation of the clutch devices 32 and 33 to start rotation of the lead screw in one direction or another thereby controlling the direction of travel of the carriage 13. Third, the operating signals open the circuit to the tape drive motor 56 to stop the tape movement.

As the carriage 13 moves, the rotation of the lead screw 28 is counted by the rotary switch 74. Acting as a pulse generator, the rotary switch 74 feeds the pulses into the preset counter in the comparator circuit 71 for counting, totalizing, and comparison with the reference number. When the comparison reaches a coincidence between the reference number and the lead screw number, a command signal is generated which simultaneously initiates three main functions. First, the preset counter is cleared of former reference and counted numbers and reset in effect to zero. Second, the clutch devices 32 and 33 are operated to stop rotation of the lead screw 28. Third, the circuit between the spindle pulse generator 47 and the motor 56 is closed, resulting in the motor 56 operating the tape device 57 to move the programmed tape 58. The step-by-step process is again repeated.

It will be noted here that the longitudinal movement of either the carriage 13 or the table 12 is translated into a known number of revolutions of the corresponding lead screw 28 or 37. Thus, by having a known relationship between the number, whether whole or fractional, of revolutions of each lead screw and the number of pulses generated by each corresponding pulse generator; upon the receipt, count and coincidence of the pulses generated by pulse generator 74, for example, with the reference number therein, the lead screw 37 has moved the carriage 13 the desired dimensional amount in accord with the command of the program on the tape 58.

As thus far described, the rate of movement of the carriage 13 or the table 12 as determined by the rate of rotation of their corresponding lead screw is in direct proportion to the rate of rotation of the drive shaft 20. This invention is directed to apparatus which provides a variable ratio drive system responsive to a continuous movement of the programmed tape 58, to maintain a selectable variable ratio between the rate of rotation of the drive shaft 20 and that of either lead screw 28 or 37, particularly when the rotational rate or speed of the drive shaft 20 varies.

The variable ratio drive system utilizes in one embodiment the known property of a synchronous motor that the speed of rotation thereof depends upon the line frequency. Thus, assuming that the rate or rotational speed of the drive shaft 20 will produce a certain number of plus and minus pulses per second by the pulse generator 47, the output speed of rotation of motor 56 can be determined. As the tape device 57 is rotated at a known rate by the motor 56, the linear velocity of the tape 58 is also known.

The tape 58 is programmed for purposes of the variable ratio drive system to have a certain number of pulses per inch so that the pulses emitted per unit of time are dependent on the linear velocity of the tape. The tape pulses thus produced are picked up by one of the channels of the magnetic play back head, indicated at 81, of the scanning means 59. The pulses from the channel 81 are transmitted through a lead 82, amplifier 83, and pulse shaper 84 to a synchronous motor 86. The output from the pulse shaper 84 is in the form of a sine wave.

The motor 86 includes an output shaft 87 connected by a worm gear arrangement 88 to the rotatable housing 89 of a conventional differential 91. Without going into detail, unnecessary for the invention, upon rotating the output shaft 87 at a certain rate, the resulting rotation of the differential housing 89 varies the drive imparted from the drive shaft 20 to the remainder 20' thereof on the opposite side of the differential 91.

It can readily be seen that by varying the rate of rotation of the output shaft 87 of the motor 86, the imparted drive of the drive shaft 20 can be varied accordingly. To accomplish this, the rate of the synchronous motor 86 can be varied by varying the ratio of the number of poles therein to the number of poles in the motor 56, or the ratio can be varied by varying the number of pulses per unit of linear measurement on the programmed tape 58.

A practical example of the variable ratio drive system is as follows. Assume the drive shaft 20 is rotating at a rate such that the rotary switch 47 will generate one hundred and twenty pulses per second, and is subsequently transformed to the equivalent of sixty cycles per second alternating current. Assuming the synchronous motor 56 to have eight poles, its output speed of rotation for the tape transport 57 would be nine hundred revolutions per minute. Assuming the arrangement of the tape transport 57 to result in a linear velocity of ten inches per second for the tape 58, should the tape be programmed with twelve pulses per inch it can readily be calculated that the equivalent of one hundred and twenty pulses per second will be transmitted to the synchronous motor 86.

Thus, the output speed of the motor 86 in this example will be in direct proportion, or at a one-to-one ratio, to the rate of rotation of the drive shaft 20. This direct proportion follows and is maintained irrespective of any variance of the rate of rotation of the input shaft 20. Consequently to vary the direct proportion, whereby to provide a selectable variable ratio between the rate of rotation of the drive shaft 20 and the rate of rotation of the driven shaft, the lead screw 28 for example, only the number of pulses programmed on the tape 58 need be varied.

To effect an accurate synchronization of the operation of the motor 86 with the remainder of the control apparatus, based only on rotation of either lead screw 28 or 37, either of the pulse generators 73 and 74 may be substituted for the rotary switch 47. The command circuit 52, having received certain signals from the tape 58 controls the operation of the clutch devices 32 and 33 to start rotation of the lead screw in one direction or another thereby controlling the direction of travel of the carriage 13. Concurrently with such operation of the clutch devices 32 and 33 the command circuit 52 opens the circuit through leads 51 and 53 to the tape drive motor 56, and closes a circuit through a lead 92, amplifier 93, and pulse shaper 94 to the motor 56.

Thus, as either lead screw 28 or 37 rotates, the motor 56 is fed a plurality of pulses from the respective pulse generator for a particular lead screw, whereby the tape 58 is moved at a rate in direct synchronization with a lead screw rotation as opposed to synchronization with rotation of the drive shaft 20. By thus eliminating gear movement inaccuracies and backlash problems, it is readily seen that the greatest degree of accuracy possible is obtained relative to utilization of the variable ratio drive system.

In summation, an automatic control apparatus is provided which is easily serviced by technician-type personnel, which has a predetermined ratio between the input drive rate and the output drive rate for moving a machine tool element, and which utilizes synchronous motors to selectively vary the ratio while the input drive rate continually varies.

Although a preferred embodiment has been disclosed herein, it is to be remembered that various changes and modifications can be made therein within the scope of the invention as defined in the appended claims.

We claim:
1. Apparatus for controlling the rate of movement of a movable element, comprising in combination:
 (a) a rotatable drive member having an input rate of rotation,
 (b) a driven member having an output rate of rotation for moving said movable element,
 (c) means for varying the drive imparted by said drive member,
 (d) means for transmitting said variable drive to said driven member,
 (e) a movable programmed tape,
 (f) means for moving said tape,
 (g) first means operably connected to said drive member for operating said tape moving means at a rate proportional to said input rate of rotation,
 (h) second means operably connected to said driven member for operating said tape moving means at a rate proportional to said output rate of rotation,
 (i) control means capable of picking up signals from said tape and selectively rendering either said first means or said second means ineffective whereby only one of said first means and said second means is effective to operate said tape moving means, and
 (j) means responsive to signals from said tape and operably connected to said drive varying means to operate said drive varying means in response to said programmed tape.

2. Apparatus for controlling the rate of movement of a movable element, comprising in combination:
 (a) a rotatable drive member having an input rate of rotation,
 (b) a driven member having an output rate of rotation, for moving said movable element,
 (c) means for varying the drive imparted by said drive member,
 (d) means for transmitting said variable drive to said driven member,
 (e) a movable programmed tape,
 (f) motor means for moving said tape,
 (g) first means including electrical means operably connected to said drive member for producing a plurality of pulses per unit of time for operating said tape moving means at a rate proportional to said input rate of rotation,
 (h) second means including electrical means operably connected to said driven member for producing a plurality of pulses per unit of time for operating said tape moving means at a rate proportional to said output rate of rotation,
 (i) control means capable of picking up signals from said tape in response to operation of said tape moving means by said first means, said control means operable to select either said first means or said second means for operating said tape moving means, and
 (j) means for transmitting signals to said drive varying means from said tape whereby the rate of rotation of said drive varying means is proportional to the rate of movement of said tape.

3. Apparatus for controlling the rate of movement of a movable element, comprising in combination:
 (a) a rotatable drive member having an input rate of rotation,
 (b) a driven member having an output rate of rotation for moving said movable element,
 (c) a differential unit for varying the rate of rotation of the drive imparted by said drive member, (d) means for transmitting said variable drive to said driven member,
(e) a linearly movable programmed tape,
(f) means including a motor responsive to electrical pulses for moving said tape,
(g) first pulse generating means operably connected with said drive member for producing an electric pulse for every predetermined degree of rotation thereof,
(h) second pulse generating means connected with said driven member for producing an electric pulse for every predetermined degree of rotation thereof,
(i) control means responsive to said signals and capable of alternately rendering ineffective one of said pulse generating means and transmitting pulses from the other of said pulse generating means to said tape moving means,
(j) means for picking up and transmitting signals from said tape, and
(k) means including a motor responsive to said signals operably connected to said differential unit whereby the rate of rotation of said variable drive is proportional to the rate of movement of said tape.

4. Apparatus for controlling the rate of movement of a movable element, comprising in combination:
(a) a rotatable drive member having an input rate of rotation,
(b) a driven member for moving said element,
(c) a differential unit for varying the rate of rotation of the drive imparted by said drive member,
(d) means including a first motor the output of which is responsive to signals received thereby at a certain rate, said motor operably connected to said differential unit for operation in response to the rate of said signal rate,
(e) a programmed record,
(f) means for moving said record,
(g) means for picking up signals from said record at a rate in response to the rate of movement of said record,
(h) first pulse generating means operably connected with said drive member for producing an electric pulse for every predetermined degree of rotation thereof,
(i) second pulse generating means operably connected with said drive member for producing an electric pulse for every predetermined degree of rotation thereof,
(j) means including a second motor the output of which is responsive to electric pulses received thereby at a certain rate, said motor operably connected to said record moving means,
(k) control means responsive to signals from said pickup means and capable of selectively alternately effecting a transmission of pulses to said second motor from said first pulse generating means and from said second pulse generating means, and
(l) means for transmitting certain of said signals picked up at a certain rate by said pickup means to said first motor, whereby the rate of rotation of said variable drive is proportional to the rate of movement of said tape.

References Cited by the Examiner

UNITED STATES PATENTS

| | | | |
|---|---|---|---|
| 1,907,132 | 5/33 | Thurston. | |
| 2,114,835 | 4/38 | Fouquet | 310—101 X |
| 2,116,593 | 5/38 | Bouvier et al. | 318—8 X |
| 2,749,491 | 6/56 | Stinger | 310—94 X |
| 2,796,565 | 6/57 | Walcott | 318—76 X |
| 2,816,257 | 12/57 | Burdorf | 318—45 |
| 2,894,187 | 7/59 | Chapman | 318—77 X |
| 2,906,900 | 9/59 | Cohen et al. | 310—101 |
| 2,927,258 | 3/60 | Lippel | 318—162 X |
| 2,943,251 | 6/60 | Hull | 318—162 |
| 3,015,806 | 1/62 | Wang et al. | 318—162 X |
| 3,039,033 | 6/62 | Benton | 310—94 X |

FOREIGN PATENTS 829,824  3/60  Great Britain.

ORIS L. RADER, *Primary Examiner.*